US008849776B2

(12) United States Patent
Bingol et al.

(10) Patent No.: US 8,849,776 B2
(45) Date of Patent: Sep. 30, 2014

(54) METHOD AND SYSTEM FOR RESOLVING DATA INCONSISTENCY (75) Inventors: Tugrul Bingol, San Carlos, CA (US); Masood Mortazavi, San Jose, CA (US); Jacob Y. Levy, Los Altos, CA (US); Patrick Nip, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 156 days.

(21) Appl. No.: 13/274,397

(22) Filed: Oct. 17, 2011

(65) Prior Publication Data

US 2013/0097130 A1 Apr. 18, 2013

(51) Int. Cl.
*G06F 17/30* (2006.01)
(52) U.S. Cl.
CPC .............................. *G06F 17/30578* (2013.01)
USPC .......................................... 707/694; 707/637
(58) Field of Classification Search
CPC .............. G06Q 10/10; G06F 17/30011; G06F 17/306227
USPC .................... 707/770, 104, 101, 10, 695, 999; 709/226, 224, 232; 714/48
See application file for complete search history.

(56) References Cited

U.S. PATENT DOCUMENTS

| | | | | | |
|---|---|---|---|---|---|
| 5,418,948 | A | * | 5/1995 | Turtle | 707/700 |
| 6,922,685 | B2 | * | 7/2005 | Greene et al. | 1/1 |
| 7,590,672 | B2 | * | 9/2009 | Slik et al. | 1/1 |
| 7,644,087 | B2 | * | 1/2010 | Barkai et al. | 707/770 |
| 7,685,131 | B2 | * | 3/2010 | Batra et al. | 707/999.01 |
| 7,694,191 | B1 | * | 4/2010 | Bono et al. | 714/48 |
| 7,788,396 | B2 | * | 8/2010 | Rose | 709/232 |
| 7,792,856 | B2 | * | 9/2010 | Fuxman et al. | 707/769 |
| 7,801,912 | B2 | * | 9/2010 | Ransil et al. | 707/770 |
| 8,069,150 | B2 | * | 11/2011 | Cohen et al. | 707/652 |
| 8,180,779 | B2 | * | 5/2012 | Horowitz et al. | 707/740 |
| 8,566,369 | B2 | * | 10/2013 | Rousseau et al. | 707/821 |
| 2002/0133504 | A1 | * | 9/2002 | Vlahos et al. | 707/104.1 |
| 2002/0174207 | A1 | * | 11/2002 | Battou | 709/223 |
| 2004/0068501 | A1 | * | 4/2004 | McGoveran | 707/8 |
| 2005/0165778 | A1 | * | 7/2005 | Obata et al. | 707/5 |
| 2005/0171932 | A1 | * | 8/2005 | Nandhra | 707/3 |
| 2008/0294604 | A1 | * | 11/2008 | Goswami | 707/3 |
| 2009/0037451 | A1 | * | 2/2009 | Borrill | 707/101 |
| 2009/0077097 | A1 | * | 3/2009 | Lacapra et al. | 707/10 |
| 2009/0106255 | A1 | * | 4/2009 | Lacapra et al. | 707/10 |
| 2009/0313311 | A1 | * | 12/2009 | Hoffmann et al. | 707/204 |
| 2010/0023509 | A1 | * | 1/2010 | Adachi et al. | 707/5 |
| 2010/0293163 | A1 | * | 11/2010 | McLachlan et al. | 707/736 |
| 2011/0040737 | A1 | * | 2/2011 | Guldner et al. | 707/695 |
| 2011/0082828 | A1 | * | 4/2011 | Fokoue-Nkoutche et al. | 706/50 |
| 2011/0307447 | A1 | * | 12/2011 | Sabaa et al. | 707/637 |
| 2013/0024412 | A1 | * | 1/2013 | Gong et al. | 706/46 |

* cited by examiner

*Primary Examiner* — James Trujillo
*Assistant Examiner* — Thong Vu
(74) *Attorney, Agent, or Firm* — Pillsbury Winthrop Shaw Pittman LLP (57) ABSTRACT

Method, system, and programs for resolving data inconsistency in a distributed system having a plurality of replica instances. In response to a read request of at least one data element, a key-specific probability value for the at least one data element of the read request is retrieved. Based on the retrieved key-specific probability value and a system load of the distributed system, a self-healing probability of the at least one data element of the read request is computed. A self-healing transaction that includes the at least one data element of the read request is then generated based on the self-healing probability of the at least one data element. The generated self-healing transaction is further applied to at least some of the plurality of replica instances in the distributed system to resolve data inconsistency.

22 Claims, 10 Drawing Sheets

METHOD AND SYSTEM FOR RESOLVING DATA INCONSISTENCY

BACKGROUND

1. Technical Field

The present teaching relates to methods, systems, and programming for resolving data inconsistency. Particularly, the present teaching is directed to methods, systems, and programming for resolving data inconsistency in a distributed system having a plurality of replica instances.

2. Discussion of Technical Background

Distributed computing/storage is a field of computer science that studies distributed systems, which include multiple autonomous computers or parallel virtual machines that communicate through a computer network, such as one or more computer clusters each having multiple nodes. Distributed systems and applications may be applied as various paradigms, including grid computing, utility computing, edge computing, and cloud computing by which users may access the server resources using a computer, netbook, tablet, smart phone, or other device through the Internet.

Replication is one of the oldest and most important topics in the overall area of distributed systems. Replication is the process of sharing information so as to ensure consistency between redundant resources, such as software or hardware components, to improve reliability, fault-tolerance, or accessibility. A distributed system where data is replicated can provide better fault tolerance capabilities as well as improved response time. One of the major concerns of replication in distributed systems is data inconsistency. For example, in massively replicated distributed systems with billions of records, each with many entries, and hundreds of geographically dispersed replica instances (each within its own administrative zone), various systemic causes can lead to data divergence, where replicas of some of the records contain entries that have divergent values. Processes that lead to divergence may not always be avoidable or predictable. The inconsistency issues include, for example, missing records in some replicas where they should be represented, missing keys in some records that some of their replicas have, and keys with different values in some records when compared to some of their replicas.

Some known solutions of resolving data inconsistency are based on an anti-entropy model that delivers inconsistencies to users to resolve conflicts. The anti-entropy model, however, is not suitable for massively replicated distributed systems because of its inefficiency. Therefore, there is a need to provide a solution for ensuring that the distributed data replication system can heal the data inconsistency itself and can decrease the occurrence of divergent values within an acceptable half-life.

SUMMARY

The present teaching relates to methods, systems, and programming for resolving data inconsistency. Particularly, the present teaching is directed to methods, systems, and programming for resolving data inconsistency in a distributed system having a plurality of replica instances.

In one example, a method, implemented on at least one machine each having at least one processor, storage, and a communication platform connected to a network for resolving data inconsistency in a distributed system having a plurality of replica instances is presented. In response to a read request of at least one data element, a key-specific probability value for the at least one data element of the read request is retrieved. Based on the retrieved key-specific probability value and a system load of the distributed system, a self-healing probability of the at least one data element of the read request is computed. A self-healing transaction that includes the at least one data element of the read request is then generated based on the self-healing probability of the at least one data element. The generated self-healing transaction is further applied to at least some of the plurality of replica instances in the distributed system to resolve data inconsistency.

In a different example, a system for resolving data inconsistency in a distributed system having a plurality of replica instances is presented, which includes a probability assigning module, a transaction generating module, and a transaction dispatcher. The probability assigning module is configured to, in response to a read request of at least one data element, retrieve a key-specific probability value for the at least one data element of the read request. The probability assigning module is also configured to compute a self-healing probability of the at least one data element of the read request based on a system load of the distributed system and the retrieved key-specific probability value. The transaction generating module is operatively coupled to the probability assigning module and is configured to generate a self-healing transaction that includes the at least one data element of the read request based on the self-healing probability of the at least one data element. The transaction dispatcher is operatively coupled to the transaction generating module and is configured to apply, via a data replication bus, the generated self-healing transaction to at least some of the plurality of replica instances in the distributed system to resolve data inconsistency.

Other concepts relate to software for resolving data inconsistency in a distributed system having a plurality of replica instances. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for resolving data inconsistency in a distributed system having a plurality of replica instances recorded thereon, wherein the information, when read by the machine, causes the machine to perform a series of steps. In response to a read request of at least one data element, a key-specific probability value for the at least one data element of the read request is retrieved. Based on the retrieved key-specific probability value and a system load of the distributed system, a self-healing probability of the at least one data element of the read request is computed. A self-healing transaction that includes the at least one data element of the read request is then generated based on the self-healing probability of the at least one data element. The generated self-healing transaction is further applied to at least some of the plurality of replica instances in the distributed system to resolve data inconsistency.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of resolving data inconsistency in a distributed system having a plurality of replica instances. The present disclosure provides a novel data affinity based approach to create additional transactions to speed-up eventual consistency and recover from lost messages. Often data that has been read and has not been corrected can be presumed to be correct after some time. Based on this correctness, the present disclosure propagates system generated transactions to speed-up eventual consistency and recover from lost messages in a massively replicated data system to achieve "self-healing" of the data inconsistency. This solution may be used in various distributed data replication systems, in particular, those where write/read ratio is very low, for example, lower than 20/80. The lower the write/read ratio is, the more effective the solution may be.

Such method, system, and programming of the present disclosure benefit users in several ways: it provides an advantage in conflict resolution acceleration and inconsistency self-healing in massively replicated data stores with billions of records and hundreds of replicas, with a much larger number of reads than writes; the system will eventually fix itself even if new inconsistencies arise; only active keys will be fixed, so no effort is wasted to fix obsolete data; the system can also be used to adjust probabilities (for read candidate selection based on throttling and key-based probabilities), all to ensure that system write capacity (availability) is not overwhelmed while maintaining a desired data consistency of the distributed data replication system.

Figure 1:
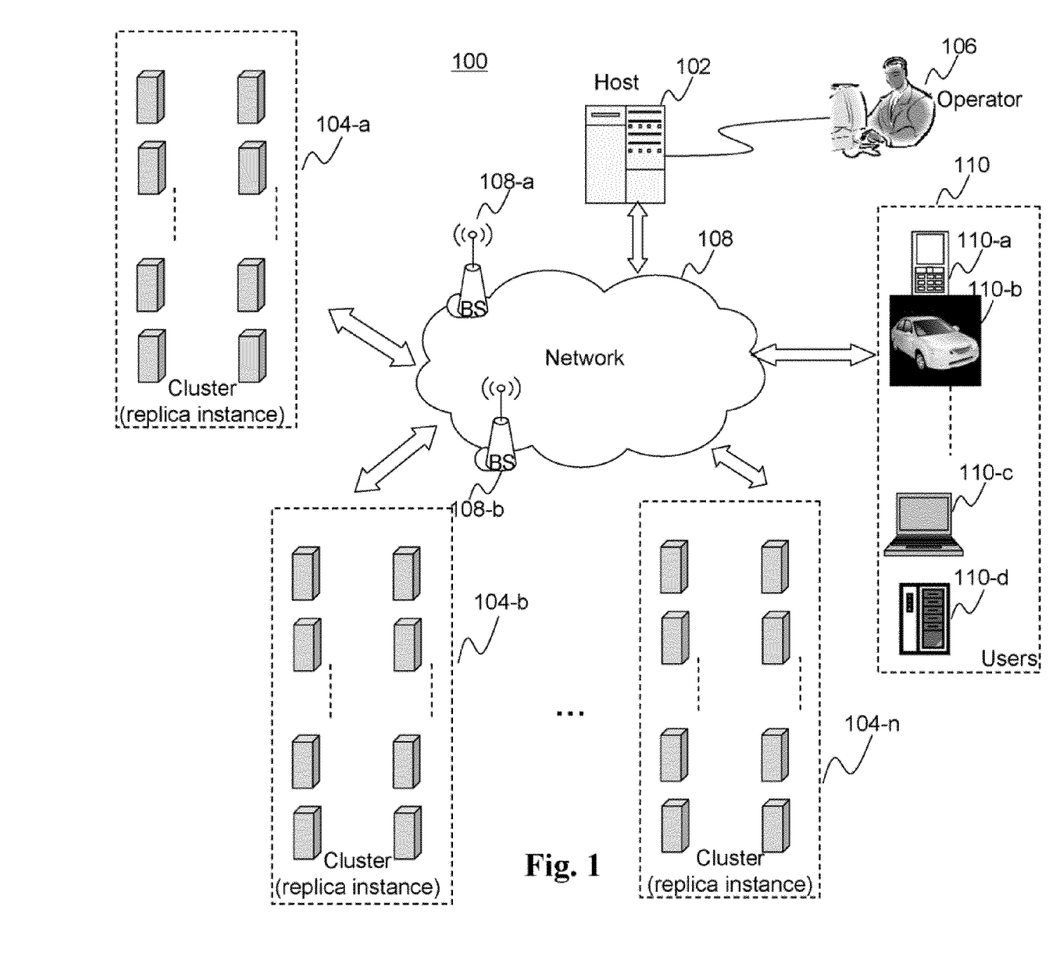
FIG. 1 depicts an exemplary embodiment of a distributed system having a plurality of replica instances in which data inconsistency is resolved, according to an embodiment of the present teaching.

FIG. 1 depicts a high level exemplary system configuration in which data inconsistency in a distributed system having a plurality of replica instances can be resolved, according to an embodiment of the present teaching. In FIG. 1, the exemplary system 100 includes a host 102, a distributed system including a plurality of clusters 104, an operator 106, a network 108, and users 110. The network 108 may be a single network or a combination of different networks. For example, the network 108 may be a local area network (LAN), a wide area network (WAN), a public network, a private network, a proprietary network, a Public Telephone Switched Network (PSTN), the Internet, a wireless network, a virtual network, or any combination thereof. The network 108 may also include various network access points, e.g., wired or wireless access points such as base stations or Internet exchange points 108-a, ..., 108-b, through which a data source may connect to the network in order to transmit information via the network.

Each cluster 104-a, 104-b, ... 104-n may be a geographically dispersed replica instance of a massively replicated and globally distributed data system 100. Each cluster/replica instance 104-a, 104-b, ... 104-n may be within its own administrative zone, for example, U.S. West, U.S. Central, or U.S. East. Each cluster 104-a, 104-b, ... 104-n may include a plurality of nodes, which communicate through the network 108 or through an internal network (not shown). The distributed system 100 replicates massively scaled databases which are hosted on multiple nodes in a replica instance 104-a, 104-b, ... 104-n. In this example, each node of a cluster 104 may be an autonomous physical machine, such as a server, a workstation, a desktop or laptop computer, a tablet, a smart phone, a television, a game console, or any other suitable machine. In another example, some or all of the nodes may be parallel virtual machines implemented by either software emulation or hardware virtualization. A cluster 104 may be a set of machines owned by one entity, e.g., an enterprise, and maintained as a server farm or server cluster where the servers are mounted on racks in a server room or data center. A cluster 104 may also be a collection of machines owned by different entities and that are physically separate from each other at a distance. Each node of each cluster 104 includes mechanism and instrumentation to ensure that the distributed system 100 can heal itself and can decrease the occurrence of divergent values within an acceptable half-life. The mechanism depends on system generated transactions based on user interaction patterns and the balancing of writes and reads to regenerate the pool of available records and record entries for self-healing acceleration. Often data that has been read and has not been corrected can be presumed to be correct after some time. Based on this correctness, the mechanism propagates system generated transactions to speed-up eventual consistency and recover from lost messages in the massively replicated data system 100 to achieve "self-healing" of the data inconsistency.

Users 110 may be of different types such as users connected to the network via desktop connections 110-*d*, users connecting to the network via wireless connections such as through a laptop 110-*c*, a handheld device 110-*a*, or a built-in device in a motor vehicle 110-*b*. A user and/or an application 110 may access to the user database (UDB) in the distributed system 100 by sending a request to a cluster 104 within the same administrative zone via the network 108 and/or receiving a response from the cluster 104 through the network 108. In this massively replicated distributed system 100, an operator 106, who may be a network administrator, operator, developer, or customer of the distributed system 104, may configure the distributed system 100 via the host 102 if needed.

Figure 2:
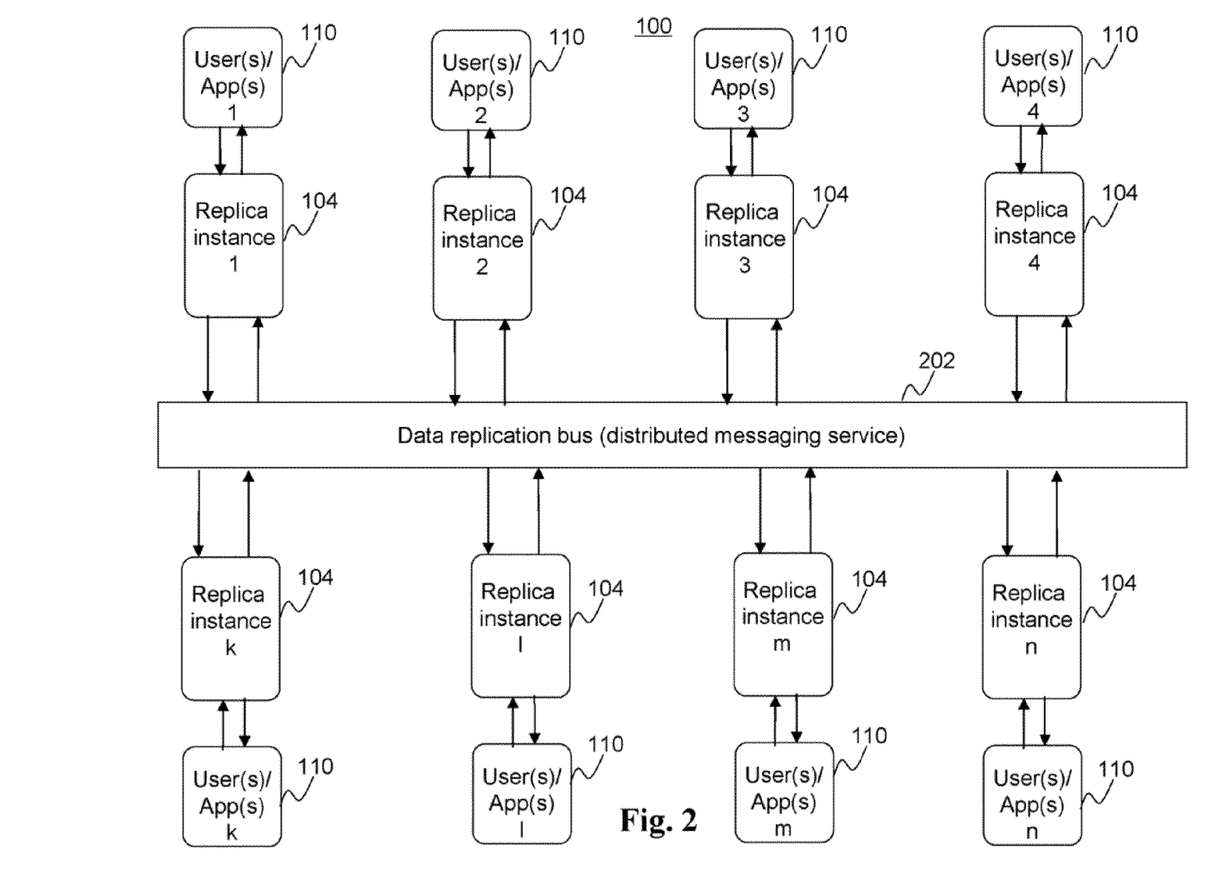
FIG. 2 is a high level exemplary system diagram of a distributed system having a plurality of replica instances in which data inconsistency is resolved, according to an embodiment of the present teaching.

FIG. 2 shows a more detailed exemplary system configuration in which data inconsistency in a distributed system having a plurality of replica instances can be resolved, according to an embodiment of the present teaching. In this exemplary embodiment, the system 100 includes a plurality of replica instances 104, each including a plurality of cluster nodes. Users and/or applications 110 may use an application programming interface (API) to initiate requests to the distributed system 100, such as a read request to read one or more data elements in one or more records stored in the distributed system 100, or a write request to update one or more data elements in one or more records stored in the distributed system 100. In response to a read request, the distributed system 100 may return the values of the requested data elements. In this example, each user/application 110 may interface with a replica instance 104 whose administrative zone covers the corresponding user/application 110. The replication of data among replica instances 104 is achieved through a data replication bus 202, for example, a distributed messaging service. The update of data elements at one replica instance is propagated to all other replica instances through the data replication bus 202.

Figure 3:
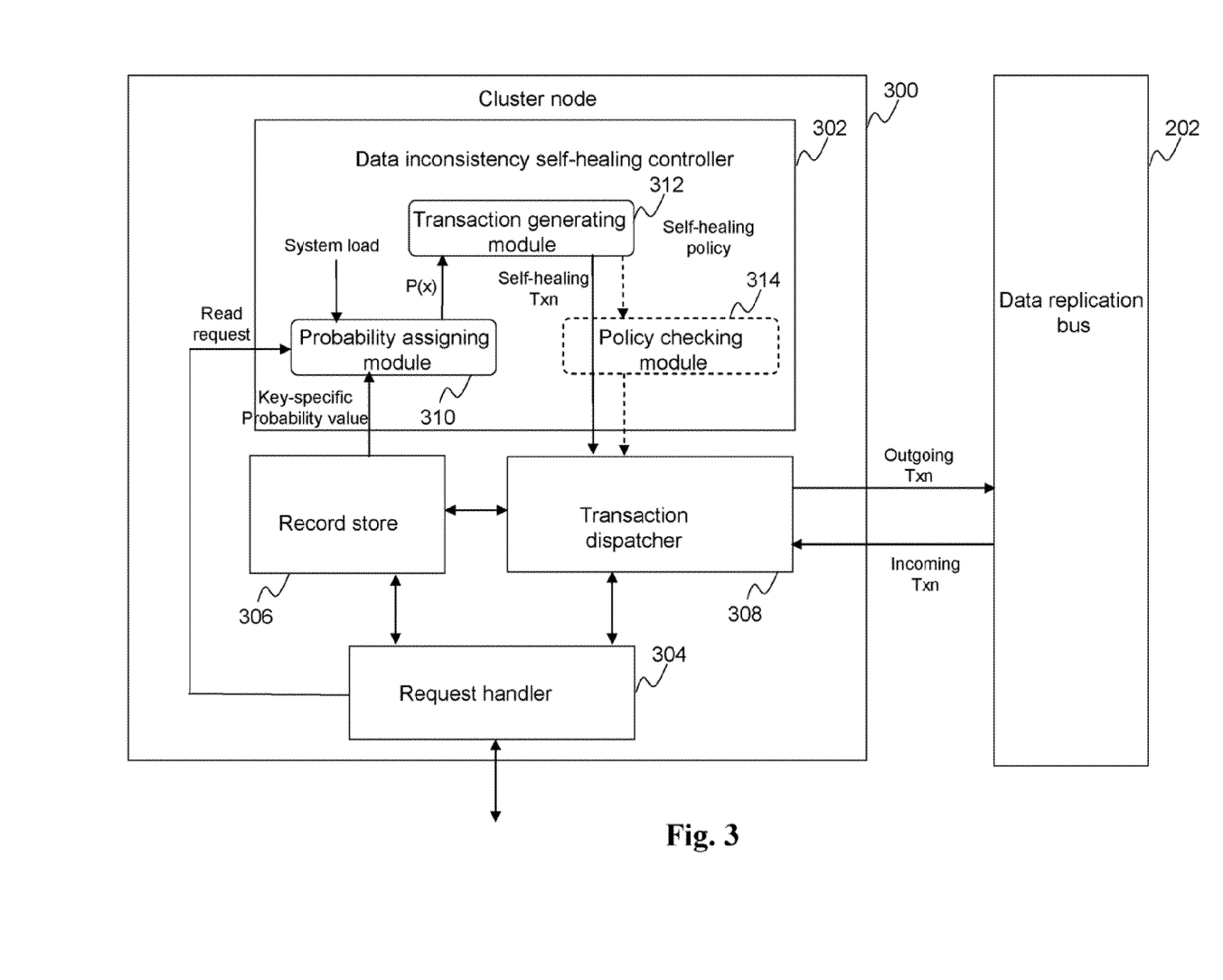
FIG. 3 is an exemplary system diagram of a system for resolving data inconsistency in a distributed system having a plurality of replica instances, according to an embodiment of the present teaching.

FIG. 3 depicts an exemplary diagram of a cluster node 300 having a data inconsistency self-healing controller 302, according to an embodiment of the present teaching. The same configuration of the exemplary cluster node 300 may be applied to all other cluster nodes in the same cluster and in other clusters of the distributed system 100. In this example, the cluster node 300 also includes a request handler 304, a record store 306, and a transaction dispatcher 308. The request handler 304 may serve as an interface with users/applications. The request handler 304 may receive requests to access the record store 306 in the cluster node 300 and respond to the requests if applicable.

Figures 4, 5:
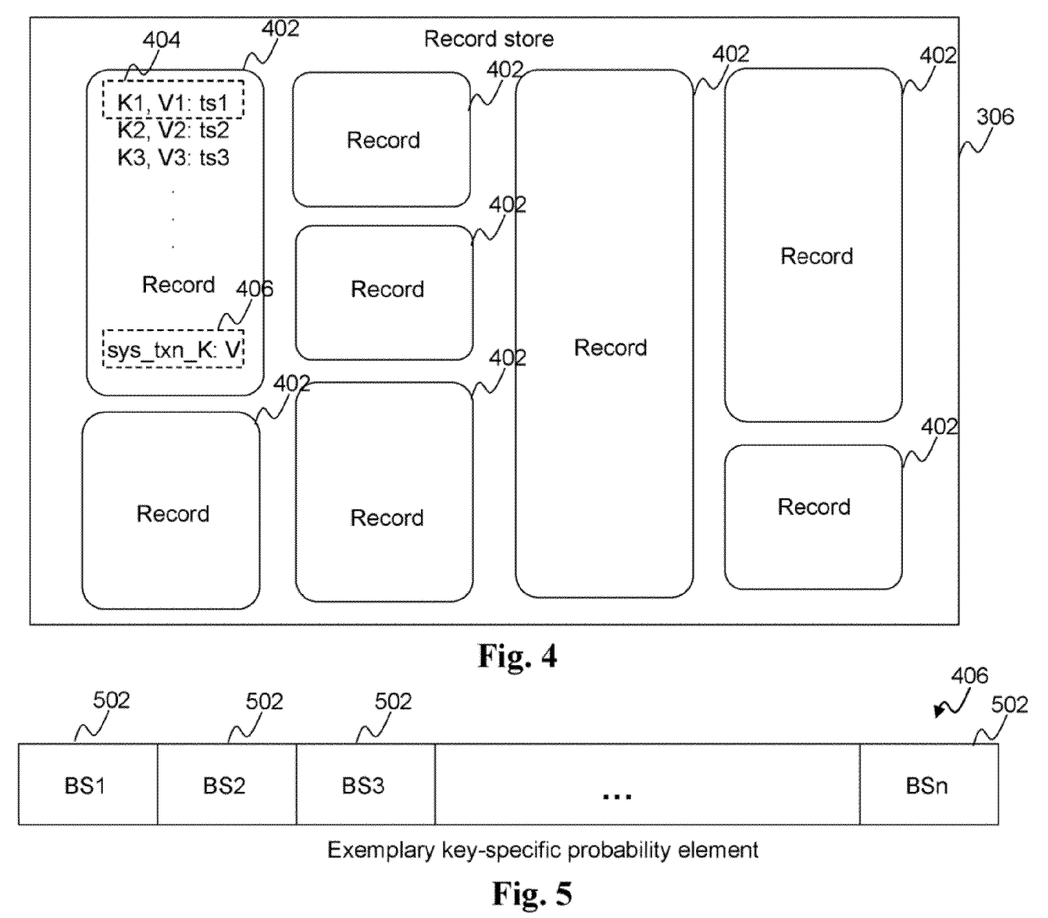
FIG. 4 is a depiction of an exemplary record store of the system for resolving data inconsistency in a distributed system having a plurality of replica instances as shown in FIG. 3, according to an embodiment of the present teaching.
FIG. 5 is a depiction of exemplary key-specific probability element including a plurality of bit sets, according to an embodiment of the present teaching.

The record store 306 may be a user database where a large number of user data is stored in the form of records. Referring now to FIG. 4 where an exemplary record store 306 is illustrated, in this example, the record store 306 contains a number of records 402, each including a plurality of data elements (data entries) 404. In this example, the size of each record 402 (i.e., the number of data elements) in the record store 306 may vary. Each data element 404 may include a key K, a value V, and a time stamp is indicating when the value of the key was most recently updated. For example, a write transaction (operation) may include one or more data element updates for a particular record but carry only a single time stamp for all the updated data elements. A response to user read requests may only carry individual elements with no time stamps included.

All data elements of a record may eventually have their own time stamps. In other examples, the time stamps may be replaced by sequence numbers or vector clocks to order updates. In addition to the data elements 404 used for storing, for example, user data, each record 402 may further include a key-specific probability element 406, which may be provided based on the transaction history for each data element 404 in the record 402. A key-specific probability element 406 does not replicate itself when the data elements 404 in the same record 402 are replicated. The key-specific probability element 406 will be described later in detail.

Referring back to FIG. 3, the transaction dispatcher 308, in this example, is operatively coupled to the data replication bus 202, the request handler 304, and the record store 306 The transaction dispatcher 308 may serve as an interface with other cluster nodes in the same or different replica instances (clusters) of the distributed system 100. The transaction dispatcher 308 may receive incoming transactions of replication and apply them to the record store 306. The transaction dispatcher 308 may also apply outgoing transactions, such as self-healing transactions, to other replica instances via the data replication bus 202.

The data inconsistency self-healing controller 302, in this example, is operatively coupled to the request handler 304, the record store 306, and the transaction dispatcher 308. The self-healing controller 302 may be configured to generate a self-healing transaction based on user/application interaction patterns and the load of the distributed system 100. The generated self-healing transaction may be applied by the transaction dispatcher 308 to other replica instances via the data replication bus 202 to resolve data inconsistency. In this example, the self-healing controller 302 includes a probability assigning module 310, a transaction generating module 312, and optionally, a policy checking module 314. The probability assigning module 310 may be configured to, in response a read request of at least one data element, retrieve a key-specific probability value for the corresponding data element of the read request. For example, a read request of one or more data elements is initiated by a user/application and received by the request handler 304. The request handler 304 transfers the request as a "trigger" to the probability assigning module 310. In response to the trigger, the probability assigning module 310 identifies the corresponding record and data elements of the read request and retrieves the corresponding key-specific probability value from the record store 306.

Referring now to FIG. 5 where an exemplary key-specific probability element 406 is illustrated. The key-specific probability element 406 is included in each of the records 402 in the record store 306. The exemplary key-specific probability element 406 may include an array of bit sets 502. Each bit set 502 may represent a key-specific probability value that a self-healing transaction for that key may occur. For example, the larger the value of a bit set 502, the higher the probability that a self-healing transaction may be dispatched for the corresponding data element 404. In one example, bit sets 502 for each key are of equal size, for example, 1, 2, 3, or 4. Initially, all bit sets 502 may be set to their maximum values. The value of each bit set 502 may be provided based on the transaction history of the corresponding data element 404. For example, the value of a bit set 502 may decrease when a self-healing transaction that includes the corresponding data element 404 has been applied; the value of a bit set 502 may increase when the corresponding data element 404 has been updated. It is understood that, in addition to transaction history, any other suitable policies may be applied to determine the value of a bit set 502. It is also understood that, in other examples, a key-specific probability element may include a probability vector to indicate the key-specific probability value for each data element instead of bit sets 502.

Referring back to FIG. 3, the probability assigning module 310 may be further configured to determine a self-healing probability P(x) for the corresponding data element of the read request based on a system load of the distributed system 100 and the retrieved key-specific probability value. The system load is applied to ensure that the system write capacity is not overwhelmed by the system generated self-healing transactions. The system load may serve as a probability scaling factor governed by the whole system throughput available for, the self-healing transactions. The probability of generating a self-healing transaction for a data element may change depending on the write throughput available in the distributed system 100. The write throughput may be represented by a read/write transaction ratio of the distributed system 100. For example, the system load of the distributed system 100 includes a read/write transaction ratio of the distributed system 100, and the self-healing probability of a data element increases as the read/write transaction ratio of the distributed system 100 increases. In one example, the read/write transaction ratio of the distributed system 100 is about 80/20. The self-healing probability of a data element, in this example, may be calculated by multiplying the value of the corresponding the bit set 502 (retrieved key-specific probability value) and the system load in the form of a probability scaling factor.

Figure 6:
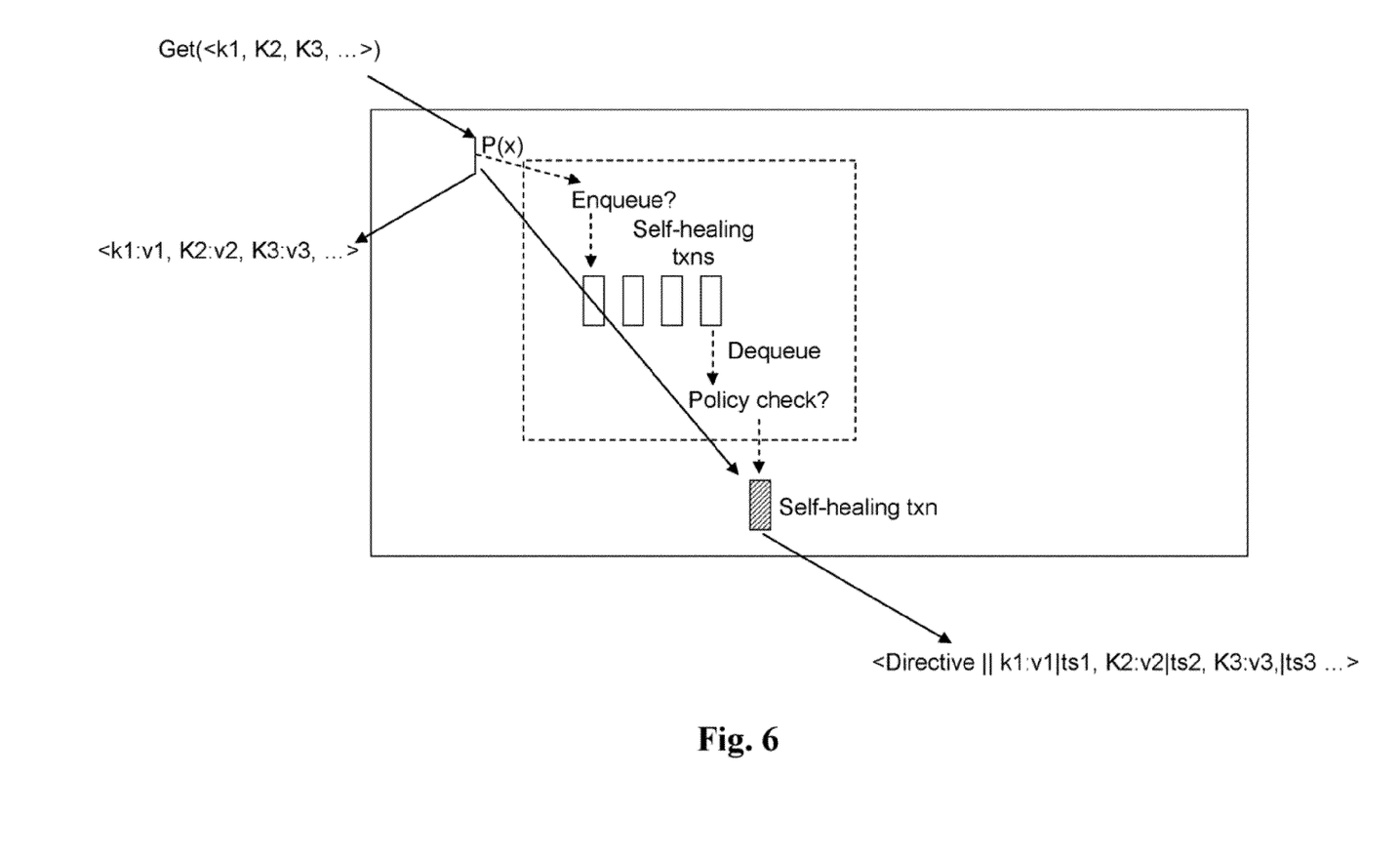
FIG. 6 is a depiction of an exemplary diagram of resolving data inconsistency in a distributed system having a plurality of replica instances, according to an embodiment of the present teaching.

In this example, the transaction generating module 312 of the self-healing controller 302 is operatively coupled to the probability assigning module 310. The transaction generating module 312 may be configured to determine whether a self-healing transaction candidate is to be initiated based on the self-healing probability P(x) of at least one data element in response to the read request of the at least one data element. The transaction initiating module 312 may be further configured to generate a self-healing transaction that includes the at least one data element of the read request based on the self-healing probability of the at least one data element. In other words, self-healing transactions may be generated in response to some read requests by choosing candidate reads at random, at a prescribed probability. In this example, each read request may trigger the transaction generating module 312 to determine whether a self-healing transaction should be generated. Referring now to FIG. 6, in this example, a user initiates a read request Get(K1, K2, K3, . . . ) to get the values of a plurality of data elements. In response, a self-healing probability P(x) is determined in order to decide whether a self-healing transaction based on the requested data elements should be generated.

A self-healing transaction may be a writing operation on at least one data element of at least some of the plurality of replica instances in response to a read request by a user or an application. It may include directive information that controls an application thereof to each of the some replica instances in the distributed system. A self-healing transaction may carry individual data element along with each individual data element's specific time stamp, as they exist in the record prior to the read. On example of a self-healing transaction, as shown in FIG. 6, is <Directive||K1:v1|ts1, K2:v2|ts2, K3:v3|ts3, . . . >. The directive information may control the application of this self-healing transaction at the target replica instance and condition its execution there. The time stamps ts1, ts2, ts3 inherit the existing time stamps of the data elements in the record prior to the read request.

As noted above, the transaction dispatcher 308 may be configured to apply, via the data replication bus 202, the generated self-healing transaction to at least some of the plurality of replica instances in the distributed system 100 to resolve data inconsistency. In other words, the generated self-healing transactions are sent immediately to other replica instances. The application of the self-healing transaction at each target replica instance may be directed by the directive information as noted above. For example, at each target replica instance, the time stamp of the data element in the self-healing transaction is compared with a time stamp of a corresponding data element in the replica instance. If the time stamp of the data element in the self-healing transaction is more recent than a time stamp of a corresponding data element in a replica instance, a value of the corresponding data element in the replica instance is replaced by the value of the data element in the self-healing transaction. Otherwise, the self-healing transaction is discarded from the corresponding replica instance.

Referring back to FIG. 3, optionally, the self-healing controller 302 may include the policy checking module 314 operatively coupled to the transaction generating module 312 and the transaction dispatcher 314. The policy checking module 314 may be configured to determine whether the self-healing transaction is to be applied based on one or more self-healing policies. Various self-healing policies, such as invalidation by a more recent write, may be applied to invalid certain self-healing transaction candidates prior to dispatch. In one example, to apply the above-mentioned self-healing policy, the policy checking module 314 first determines whether a write transaction has been requested, wherein the write transaction applies to the same data element in a corresponding self-healing transaction candidate. If the write transaction has been requested, the transaction generating module 314 discards the corresponding self-healing transaction. Referring now to FIG. 6, optionally, the generated self-healing transactions may not be immediately applied but instead, are temporally stored in queue. A policy check is applied to any self-healing transaction in the queue or dequeued. In this example, a self-healing transaction may be applied only when it passes the policy check. In one example, a slower rate of queue processing may be applied so that proximal writes on the same data element can trump the queued self-healing transaction that includes any of the same recently written keys in the candidate queue.

Figure 7:
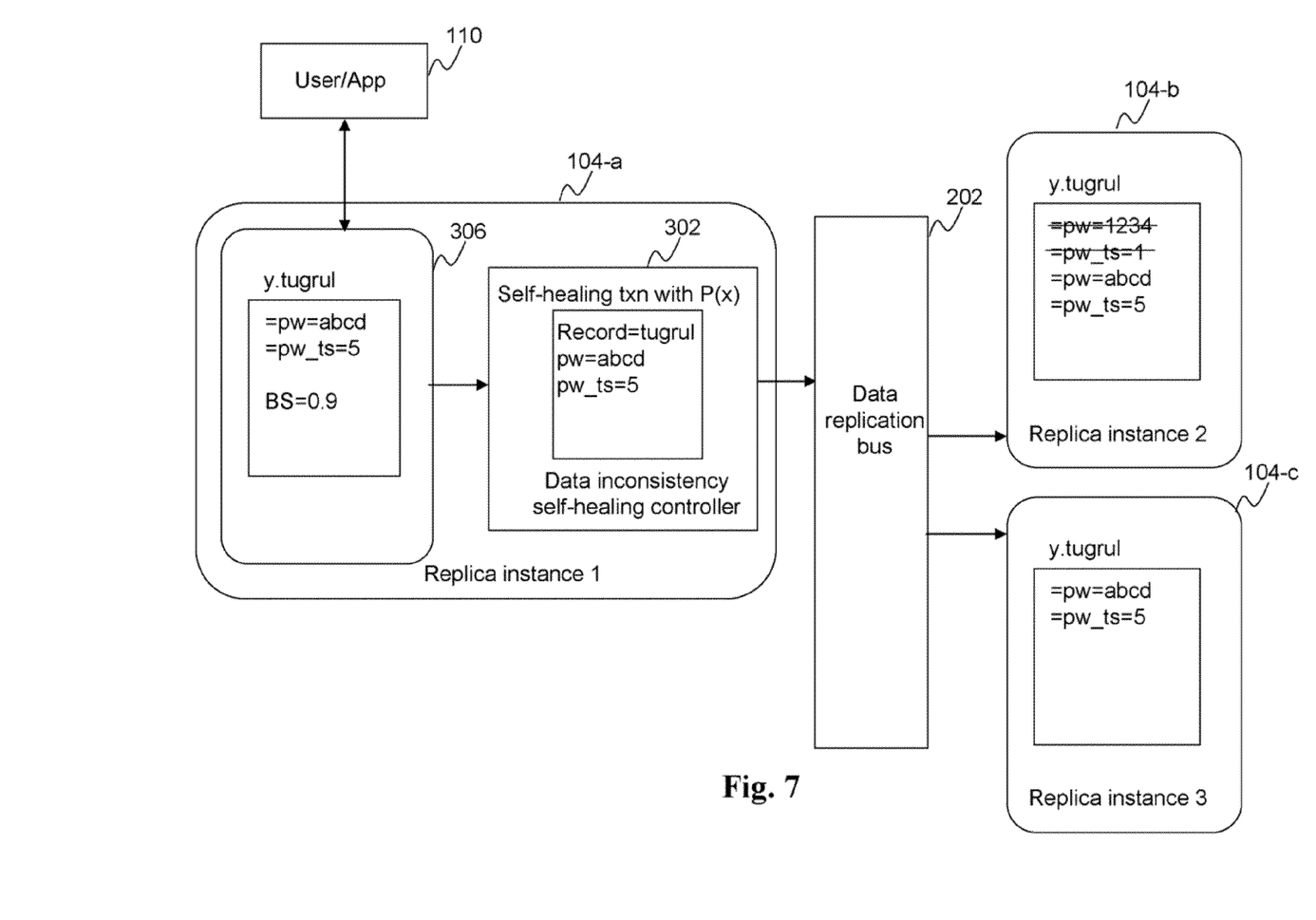
FIG. 7 is a depiction of an exemplary application of resolving data inconsistency in a distributed system having a plurality of replica instances, according to an embodiment of the present teaching.

FIG. 7 is a depiction of an exemplary application of resolving data inconsistency in a distributed system having a plurality of replica instances, according to an embodiment of the present teaching. In this example, a user/application 110 initiates a read request the value of the "password" key in the "y_tugrul" record stored in replica instance "1" 104-*a*. The value of the requested data element is "abcd," the time stamp is "5" (last updated time), and the bit set is "0.9." The self-healing transaction in response to the read request is generated by the self-healing controller 302 after being randomly selected at its corresponding probability P(x). The self-healing transaction is then dispatched and propagated to replica instance "2" 104-*b* and replica instance "3" 104-*c*. At replica instance "2" 104-*b*, the time stamps of the corresponding data elements (the "password" in the "y_tugrul" record) in the self-healing transaction and the replica instance "2" 104-*b* are compared. Since the time stamp "5" in the self-healing transaction is more recent than a time stamp "1" in the replica instance "2" 104-*b*, the inconsistent value "1234" of the replica instance "2" 104-*b* is replaced by the value "abcd" in the self-healing transaction. The time stamp of the "password" data element in the replica instance "2" 104-*b* is also updated to be the same as that of the self-healing transaction. At replica instance "3" 104-*c*, since the time stamp "5" in the self-healing transaction is not more recent than a time stamp "5" in the replica instance 3 104-*c*, the self-healing transaction is discarded.

Figure 8:
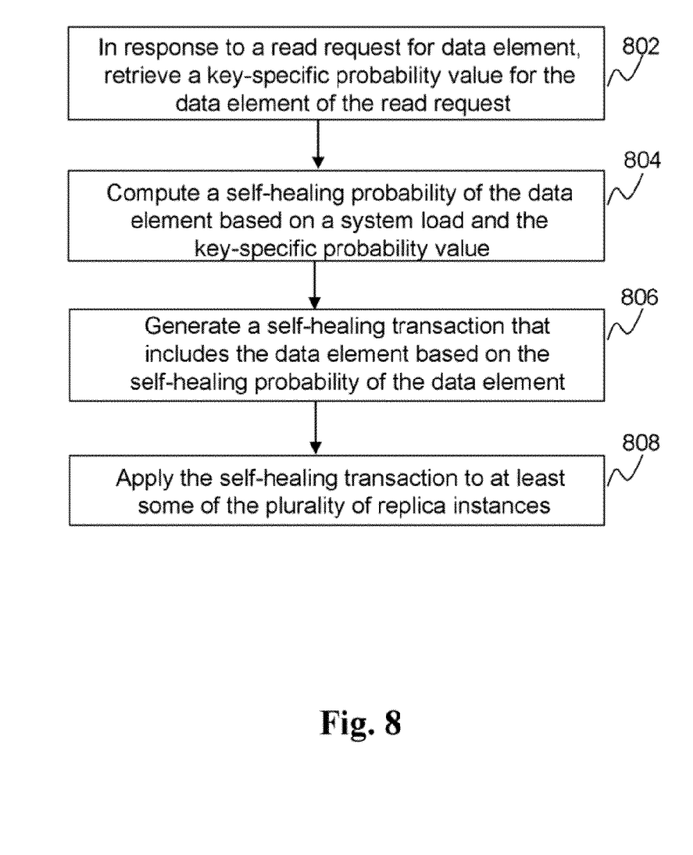
FIG. 8 is a flowchart of an exemplary process of resolving data inconsistency in a distributed system having a plurality of replica instances, according to an embodiment of the present teaching.

FIG. 8 is a flowchart of an exemplary process in which data inconsistency in a distributed system having a plurality of replica instances is resolved, according to an embodiment of the present teaching. Beginning at block 802, in response to a read request of at least one data element, a key-specific probability value for the at least one data element of the read request is retrieved. At block 804, self-healing probability of the at least one data element of the read request is computed based on a system load of the distributed system and the retrieved key-specific probability value. As described above, blocks 802, 804 may be performed by the probability assigning module 310 of the self-healing controller 302. At block 806, processing may continue where a self-healing transaction that includes the at least one data element of the read request is generated based on the self-healing probability of the at least one data element. As described above, this may be performed by the transaction generating module 312 of the self-healing controller 302. Proceeding to block 808, the generated self-healing transaction is applied to at least some of the plurality of replica instances in the distributed system to resolve data inconsistency. As described above, this may be performed by the transaction dispatcher 308 via the data replication bus 202.

Figure 9:
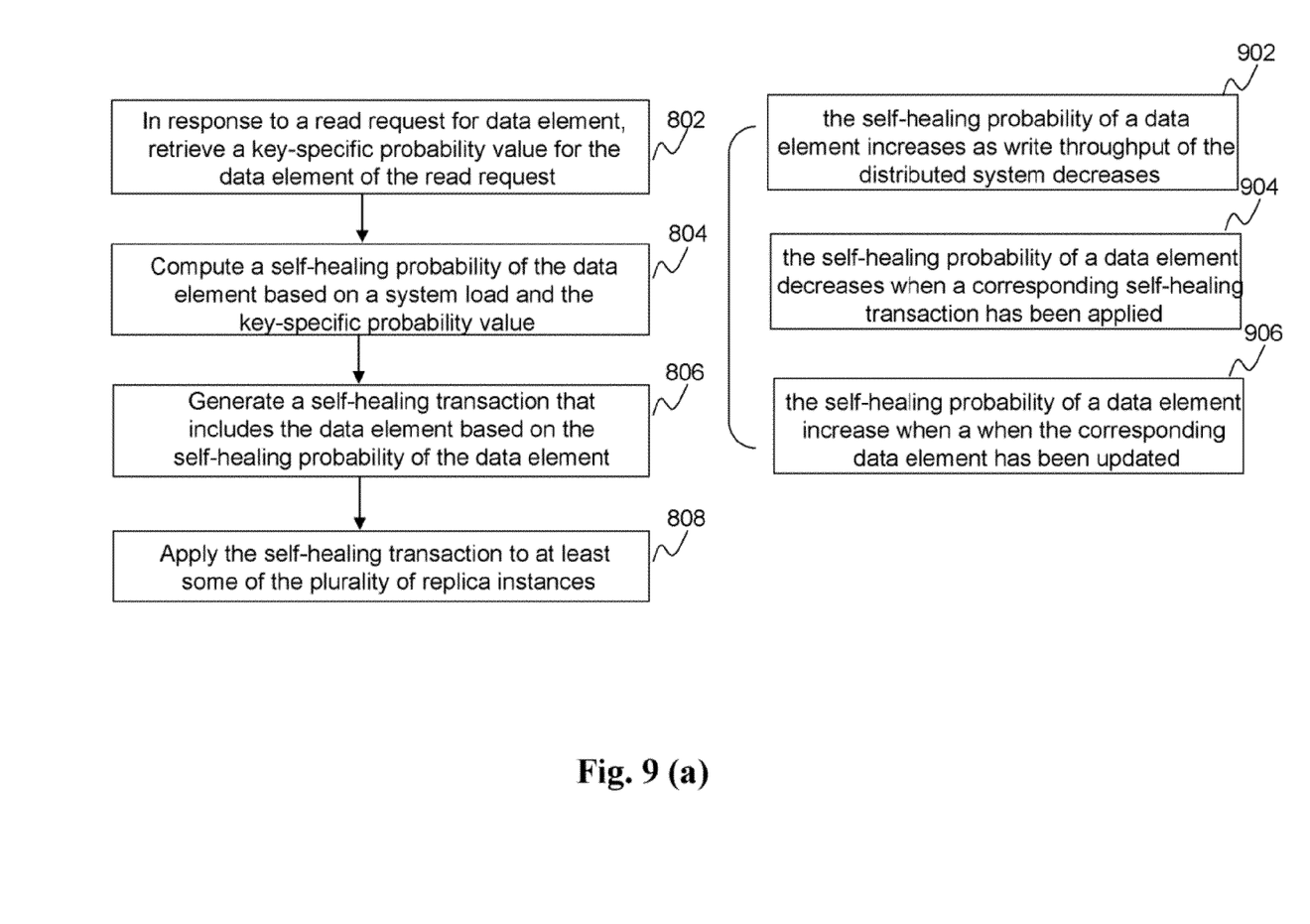
FIGS. 9(a) and 9(b) are detailed flowcharts of exemplary processes of resolving data inconsistency in a distributed system having a plurality of replica instances, according to various embodiment of the present teaching.

FIG. 9(*a*) is a more detailed flowchart of an exemplary process in which data inconsistency in a distributed system having a plurality of replica instances is resolved, according to an embodiment of the present teaching. Various factor may affect computing the self-healing probability the data element. In block 902, the self-healing probability of a data element increases as write throughput of the distributed system decreases. In block 904, the self-healing probability of a data element decreases when a corresponding self-healing transaction has been applied. In block 906, the self-healing probability of a data element increase when a when the corresponding data element has been updated.

FIG. 9(*b*) is another more detailed flowchart of an exemplary process in which data inconsistency in a distributed system having a plurality of replica instances is resolved, according to an embodiment of the present teaching. Beginning at block 802, in response to a read request of at least one data element, a key-specific probability value for the at least one data element of the read request is retrieved. At block 804, self-healing probability of the at least one data element of the read request is computed based on a system load of the distributed system and the retrieved key-specific probability value. As described above, blocks 802, 804 may be performed by the probability assigning module 310 of the self-healing controller 302. At block 806, processing may continue where a self-healing transaction that includes the at least one data element of the read request is generated based on the self-healing probability of the at least one data element. As described above, this may be performed by the transaction generating module 312 of the self-healing controller 302. At block 908, whether the self-healing transaction is to be applied is determined based on one or more self-healing policies. As described above, blocks 908 may be performed by the policy checking module 314 of the self-healing controller 302. Proceeding to block 910, the time stamp of the at least one data element in the self-healing transaction is compared with a time stamp of a corresponding data element in each replica instance. At block 912, if the time stamp of the at least one data element in the self-healing transaction is more recent than a time stamp of a corresponding data element in a replica instance, a value of the corresponding data element in the replica instance is replaced with the value of the at least one data element in the self-healing transaction. Otherwise, at block 914, the self-healing transaction is discarded from the corresponding replica instance. As described above, blocks 910, 912, 914 may be performed by the transaction dispatcher 308 via the data replication bus 202.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 10:
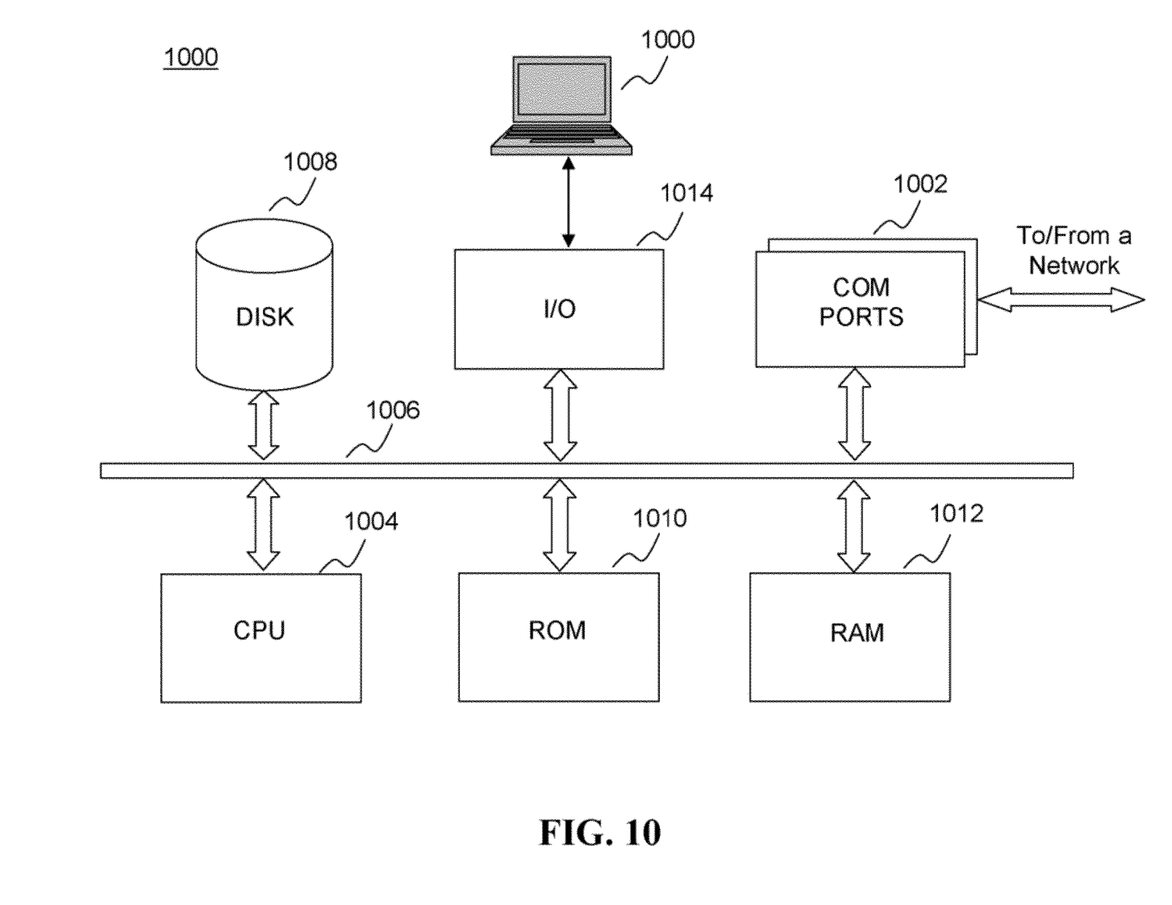
FIG. 10 depicts a general computer architecture on which the present teaching can be implemented.

FIG. 10 depicts a general computer architecture on which the present teaching can be implemented and has a functional block diagram illustration of a computer hardware platform that includes user interface elements. The computer may be a general-purpose computer or a special purpose computer. This computer 1000 can be used to implement any components of the data inconsistency self-healing architecture as described herein. Different components of the system, e.g., as depicted in FIGS. 1-3, can all be implemented on one or more computers such as computer 1000, via its hardware, software program, firmware, or a combination thereof. Although only one such computer is shown, for convenience, the computer functions relating to data inconsistency self-healing may be implemented in a distributed fashion on a number of similar platforms, to distribute the processing load.

The computer 1000, for example, includes COM ports 1002 connected to and from a network connected thereto to facilitate data communications. The computer 1000 also includes a central processing unit (CPU) 1004, in the form of one or more processors, for executing program instructions. The exemplary computer platform includes an internal communication bus 1006, program storage and data storage of different forms, e.g., disk 1008, read only memory (ROM) 1010, or random access memory (RAM) 1012, for various data files to be processed and/or communicated by the computer, as well as possibly program instructions to be executed by the CPU. The computer 1000 also includes an I/O component 1014, supporting input/output flows between the computer and other components therein such as user interface elements 1016. The computer 1000 may also receive programming and data via network communications.

Hence, aspects of the method of resolving data inconsistency in a distributed system having a plurality of replica instances, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Nonvolatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one machine each having at least one processor, storage, and a communication platform connected to a network for resolving data inconsistency in a distributed system having a plurality of replica instances, comprising:

in response to a read request of at least one data element, retrieving, by a probability assigning module, a first probability associated with the at least one data element of the read request;

computing, by the probability assigning module, a second probability associated with the at least one data element of the read request based on a write throughput of the distributed system and the retrieved first probability;

generating, by a transaction generating module, a transaction associated with the at least one data element of the read request based on the second probability associated with the at least one data element; and applying, by a transaction dispatcher via a data replication bus, the generated transaction to at least some of the plurality of replica instances in the distributed system to resolve data inconsistency across the at least some of the plurality of replica instances.

2. The method of claim 1, wherein
the second probability associated with a data element increases as the write throughput of the distributed system decreases.

3. The method of claim 1, wherein
the first probability associated with a data element is provided based on a transaction history of the data element;
the second probability associated with a data element decreases when a transaction associated with the data element has been applied; and
the second probability associated with a data element increases when the data element has been updated.

4. The method of claim 1 further comprising determining, by a policy checking module, whether the transaction is to be applied based on one or more predetermined rules.

5. The method of claim 4, wherein the step of determining whether the transaction is to be applied comprises:
determining whether a write transaction has been requested, wherein the write transaction is associated with the same at least one data element in the transaction; and
discarding the transaction if the write transaction has been requested.

6. The method of claim 1, wherein
the at least one data element in the transaction includes a key, a value, and a time stamp indicating when the value of the at least one data element was most recently updated; and
the step of applying the generated transaction comprises:
comparing the time stamp of the at least one data element associated with the transaction with a time stamp of a corresponding data element in each replica instance,
if the time stamp of the at least one data element associated with the transaction is more recent than a time stamp of a corresponding data element in a replica instance, replacing a value of the corresponding data element in the replica instance with the value of the at least one data element associated with the transaction, and
if the time stamp of the at least one data element associated with the transaction is not more recent than the time stamp of a corresponding data element in a replica instance, discarding the transaction in the corresponding replica instance.

7. The method of claim 1, wherein
the transaction is an writing operation on at least one data element of at least some of the plurality of replica instances in response to a read request by a user or an application; and the transaction includes directive information that controls an application thereof to each of the some replica instances in the distributed system.

8. A system for resolving data inconsistency in a distributed system having a plurality of replica instances, comprising:
- a probability assigning module configured to
  - in response to a read request of at least one data element, retrieve a first probability associated with the at least one data element of the read request, and
  - compute a second probability associated with the at least one data element of the read request based on a write throughput of the distributed system and the retrieved first probability;
- a transaction generating module operatively coupled to the probability assigning module, configured to generate a transaction associated with the at least one data element of the read request based on the second probability associated with the at least one data element; and
- a transaction dispatcher operatively coupled to the transaction generating module, configured to apply, via a data replication bus, the generated transaction to at least some of the plurality of replica instances in the distributed system to resolve data inconsistency across the at least some of the plurality of replica instances.

9. The system of claim 8, wherein
the second probability associated with a data element increases as the write throughput of the distributed system decreases.

10. The system of claim 8, wherein
the first probability associated with a data element is provided based on a transaction history of the data element;
the second probability associated with a data element decreases when a transaction associated with the data element has been applied; and
the second probability associated with a data element increases when the data element has been updated.

11. The system of claim 8 further comprising a policy checking module operatively coupled to the transaction generating module and the transaction dispatcher, configured to determine whether the transaction is to be applied based on one or more predetermined rules.

12. The system of claim 11, wherein the policy checking module, in determining whether a self-healing transaction is to be generated, is further configured to:
determine whether a write transaction has been requested, wherein the write transaction is associated with the same at least one data element in the transaction; and
discard the transaction if the write transaction has been requested.

13. The system of claim 8, wherein
the at least one data element in the transaction includes a key, a value, and a time stamp indicating when the value of the at least one data element was most recently updated; and
the step of applying the generated transaction comprises:
comparing the time stamp of the at least one data element associated with the transaction with a time stamp of a corresponding data element in each replica instance,
if the time stamp of the at least one data element associated with the transaction is more recent than a time stamp of a corresponding data element in a replica instance, replacing a value of the corresponding data element in the replica instance with the value of the at least one data element associated with the transaction, and
if the time stamp of the at least one data element associated with the transaction is not more recent than the time stamp of a corresponding data element in a replica instance, discarding the transaction in the corresponding replica instance.

14. The system of claim 8, wherein
the transaction is an writing operation on at least one data element of at least some of the plurality of replica instances in response to a read request by a user or an application; and
the transaction includes directive information that controls an application thereof to each of the some replica instances in the distributed system.

15. A machine-readable tangible and non-transitory medium having information recorded thereon for resolving data inconsistency in a distributed system having a plurality of replica instances, wherein the information, when read by the machine, causes the machine to perform the following:
in response to a read request of at least one data element, retrieving a first probability associated with the at least one data element of the read request;
computing a second probability associated with the at least one data element of the read request based on a write throughput of the distributed system and the retrieved first probability;
generating a transaction associated with the at least one data element of the read request based on the second probability associated with the at least one data element; and
applying the generated transaction to at least some of the plurality of replica instances in the distributed system to resolve data inconsistency across the at least some of the plurality of replica instances.

16. The medium of claim 15, wherein
the second probability associated with a data element increases as the write throughput of the distributed system decreases.

17. The medium of claim 15, wherein
the first probability associated with a data element is provided based on a transaction history of the data element;
the second probability associated with a data element decreases when a transaction associated with the data element has been applied; and
the second probability associated with a data element increases when the data element has been updated.

18. The medium of claim 15 further comprising determining whether the transaction is to be applied based on one or more predetermined rules.

19. The medium of claim 15, wherein the step of determining whether the self-healing transaction is to be applied comprises:
determining whether a write transaction has been requested, wherein the write transaction is associated with the same at least one data element in the transaction; and
discarding the transaction if the write transaction has been requested.

20. The medium of claim 15, wherein
the at least one data element in the transaction includes a key, a value, and a time stamp indicating when the value of the at least one data element was most recently updated; and
the step of applying the generated transaction comprises:
comparing the time stamp of the at least one data element associated with the transaction with a time stamp of a corresponding data element in each replica instance, if the time stamp of the at least one data element associated with the transaction is more recent than a time stamp of a corresponding data element in a replica instance, replacing a value of the corresponding data element in the replica instance with the value of the at least one data element associated with the transaction, and if the time stamp of the at least one data element associated with the transaction is not more recent than the time stamp of a corresponding data element in a replica instance, discarding the transaction in the corresponding replica instance.

21. The medium of claim 15, wherein the transaction is an writing operation on at least one data element of at least some of the plurality of replica instances in response to a read request by a user or an application; and the transaction includes directive information that controls an application thereof to each of the some replica instances in the distributed system.

22. The method of claim 1, wherein the second probability is computed by multiplying the first probability and a scaling factor determined based on the write throughput of the distribution system.

* * * * *